(12) United States Patent
Morita et al.

(10) Patent No.: US 8,867,489 B2
(45) Date of Patent: Oct. 21, 2014

(54) MOBILE COMMUNICATION METHOD AND EXCHANGE

(75) Inventors: Takashi Morita, Tokyo (JP); Itsuma Tanaka, Tokyo (JP); Kazuki Takita, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 32 days.

(21) Appl. No.: 13/518,071

(22) PCT Filed: Dec. 24, 2010

(86) PCT No.: PCT/JP2010/073432
§ 371 (c)(1),
(2), (4) Date: Jul. 25, 2012

(87) PCT Pub. No.: WO2011/078363
PCT Pub. Date: Jun. 30, 2011

(65) Prior Publication Data
US 2012/0282917 A1    Nov. 8, 2012

(30) Foreign Application Priority Data

Dec. 24, 2009  (JP) .................................. 2009-293016

(51) Int. Cl.
| | | |
|---|---|---|
| H04W 4/00 | (2009.01) | |
| H04L 12/56 | (2006.01) | |
| H04W 24/00 | (2009.01) | |
| H04W 8/08 | (2009.01) | |
| H04W 80/04 | (2009.01) | |
| H04W 76/04 | (2009.01) | |
| H04W 88/14 | (2009.01) | |
| H04W 36/12 | (2009.01) | |
| H04W 60/00 | (2009.01) | |

(52) U.S. Cl.
CPC .............. *H04W 8/08* (2013.01); *H04W 80/045* (2013.01); *H04W 76/041* (2013.01); *H04W 88/14* (2013.01); *H04W 36/12* (2013.01); *H04W 60/00* (2013.01)
USPC ........... 370/331; 370/328; 370/389; 455/423; 455/435.1; 455/442

(58) Field of Classification Search
USPC .......... 370/331, 328, 389, 469; 455/442, 423, 455/435.1, 436, 445, 403
See application file for complete search history.

(56) References Cited

U.S. PATENT DOCUMENTS 6,233,458 B1 *   5/2001   Haumont et al. .............. 455/445
7,283,497 B2 *  10/2007   Mueller ........................ 370/331

(Continued)

OTHER PUBLICATIONS

3GPP TS 23.060 V9.3.0, (Dec. 2009).*

(Continued)

*Primary Examiner* — Jinsong Hu
*Assistant Examiner* — William Nealon
(74) *Attorney, Agent, or Firm* — Osha Liang LLP (57) ABSTRACT

The present invention is designed such that a new SGSN receives a location update message from a terminal (1) having moved from the management area of an old SGSN to the management area of the new SGSN, and the new SGSN having received the location update message sends a GTPv2 signal for getting communication path information corresponding to GTPv2, to the old SGSN. The old SGSN, upon receiving the GTPv2 signal, if holding communication path information of to GTPv1 as a logical communication path established for the terminal (1), sends, as a response, a GTPv2 signal in which the communication path information by GTPv1 is set in an additional parameter 24, to the new SGSN.

5 Claims, 9 Drawing Sheets (56) References Cited

U.S. PATENT DOCUMENTS

| | | | |
|---|---|---|---|
| 2003/0153296 A1* | 8/2003 | Mueller | 455/403 |
| 2008/0219218 A1* | 9/2008 | Rydnell et al. | 370/331 |
| 2009/0016300 A1* | 1/2009 | Ahmavaara et al. | 370/331 |
| 2009/0016334 A1* | 1/2009 | Forsberg et al. | 370/389 |

OTHER PUBLICATIONS

3GPP TS 23.060 V6.12.0 (Mar. 2006) Release 6.*
3GPP TS 29.060 V8.10.0, Dec. 2009, "3rd Generation Partnership Project; Technical Specification Group Core Network and Terminals; General Packet Radio Service (GPRS); GPRS Tunnelling Protocol (GTP) across the Gn and Gp interface (Release 8)," 148 pages.
3GPP TS 29.274 V8.4.0, Dec. 2009, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 141 pages.
3GPP TS 23.060 V8.7.0, Dec. 2009, "3rd Generation Partnership Project; Technical Specification Group Services and System Aspects; General Packet Radio Service (GPRS); Service description; Stage 2 (Release 8)," 280 pages.
Translation of International Search Report issued in PCT/JP2010/073432, mailed on Mar. 29, 2011, 2 pages.
Notification of Reasons for Refusal in corresponding Korean application No. 519987022429 dated Aug. 31, 2012 (5 pages).

* cited by examiner

FIG. 9

MOBILE COMMUNICATION METHOD AND EXCHANGE

TECHNICAL FIELD

The present invention relates to a mobile communication method and an exchange for packet access control, for allowing a new SGSN (Serving GPRS Support Node), which serves a terminal after moving, to get bearer information from an old SGSN which serves the terminal before moving.

BACKGROUND ART

According to the current 3GPP specifications, in a location update procedure in inter-SGSNs in a case where a terminal is in idle mode, a processing in which the new SGSN gets bearers in a preservation state from the old SGSN is defined (non-patent literature 1). As for the types of bearers, there are PDP context for GPRS users and EPS context for EPS users, and the current 3GPP specifications describes getting these only by GTPv1 (GTP protocol, version 1) signals and GTPv2 (GTP protocol, version 2) signals (non-patent literatures 2 and 3) respectively.

Figure 8:
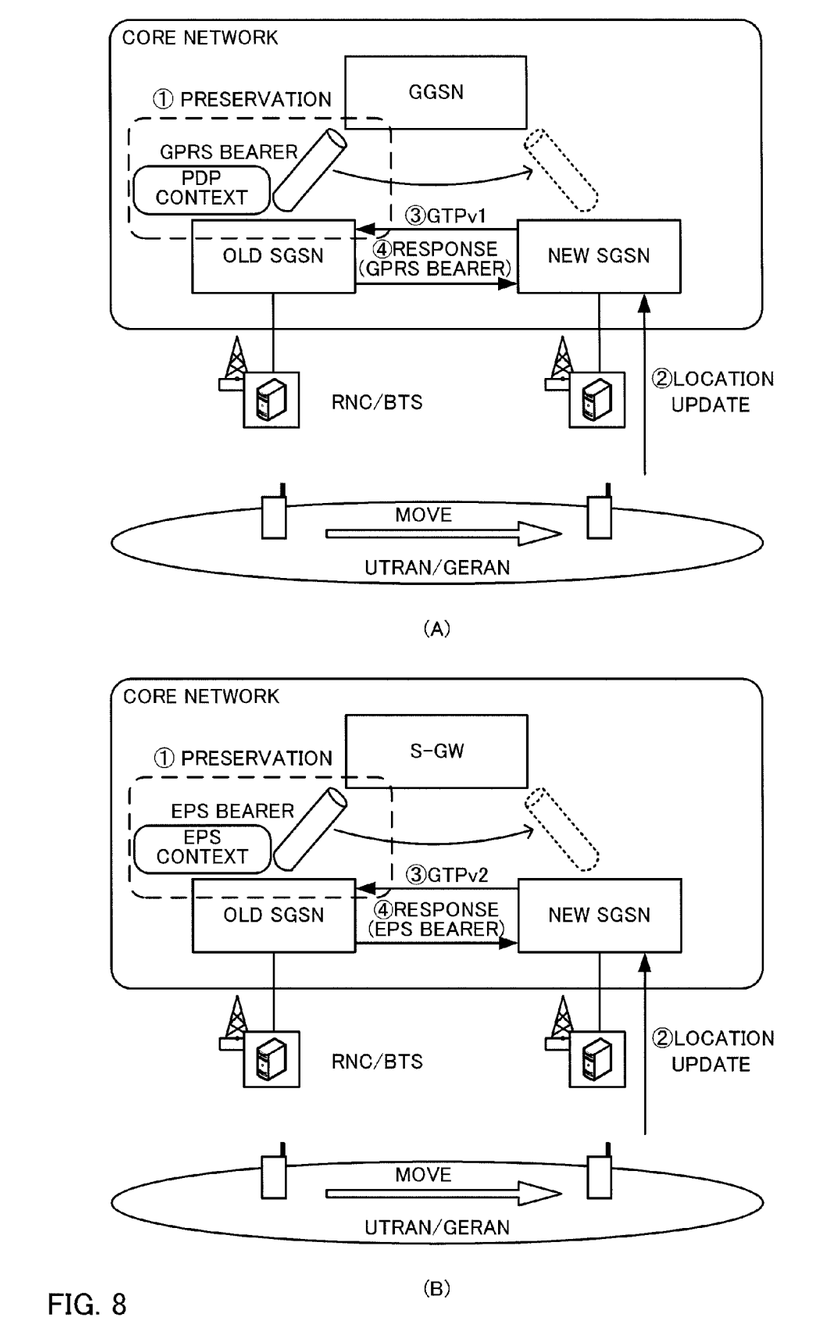
FIG. 8 is a diagram illustrating the procedure of getting bearer information at a new SGSN from an old SGSN.

FIGS. 8(A) and (B) illustrate the procedure of getting bearer information from an old SGSN to a new SGSN, where FIG. 8(A) illustrates a case of getting bearer information (PDP context) which is logical communication path information, using a GTPv1 signal to serve as a second protocol signal, and FIG. 8(B) illustrates a case of getting bearer information (EPS context), using a GTPv2 signal to serve as the first protocol signal.

As illustrated in FIG. 8(A), when a terminal UE in idle mode moves between SGSNs and sends a location update message to the new SGSN, the new SGSN gets the GPRS bearer information having been established on the old side, from the old SGSN. For this, the new SGSN requests bearer information to the old SGSN using a GTPv1 signal. Upon receiving the GTPv1 signal from the new SGSN, the old SGSN sets bearer information of the GPRS bearer that is currently established, in a response signal, and returns this response signal. The new SGSN gets the bearer information based on the bearer information set in the response signal from the old SGSN, and, based on the bearer information (PDP context), establishes a GPRS bearer between the new SGSN and the GGSN.

Also, as illustrated in FIG. 8(B), when the new SGSN gets EPS bearer information that is established between the old SGSN and the S-GW, the new SGSN requests bearer information to the old SGSN using a GTPv2 signal. Upon receiving the GTPv2 signal from the new SGSN, the old SGSN sets bearer information (EPS context) of the EPS bearer that is currently established, in a response signal, and returns this response signal. Based on the bearer information set in the response signal, the new SGSN establishes a new EPS bearer between the new SGSN and the S-GW.

By the way, to achieve interoperability between UMTS and EPS, an SGSN, which connects a terminal supporting UTRAN (W-CDMA/HSPA) to an EPC network, supports both a GTPv1 signal and a GTPv2 signal. Consequently, upon getting bearer information from the old SGSN, the bearer information is requested using either the GTPv1 signal or the GTPv2 signal.

CITATION LIST

Non-Patent Literature

Non-Patent Literature 1: 3GPP TS23.060 (version 8.7.0)
Non-Patent Literature 2: 3GPP TS29.060 (version 8.10.0)
Non-Patent Literature 3: 3GPP TS29.274 (version 8.4.0)

SUMMARY OF INVENTION

Technical Problem

However, according to the present specifications, only EPS bearer information can be set in the GTPv2 signal, and GPRS bearer information cannot be set. Also, on the other hand, only GPRS bearer information can be set in the GTPv1 signal, and EPS bearer information cannot be set. Consequently, when an old SGSN supports both protocols (GTPv1 and GTPv2) and bearer information which the old SGSN holds and the version of the GTP signal received from a new SGSN do not match, there is a possibility of leading to a case where it is not possible to get bearer information. For example, referring to FIG. 8(A), where the old SGSN supports GTPv1 and GTPv2 and has a GPRS bearer established with a to GPRS user, if a bearer information getting request from the new SGSN is received by the GTPv2 signal, the old SGSN is unable to set the GPRS bearer information that needs to be passed, in a signal, and therefore returns an error, raising a problem that a service to the GPRS user is interrupted.

Figure 9:
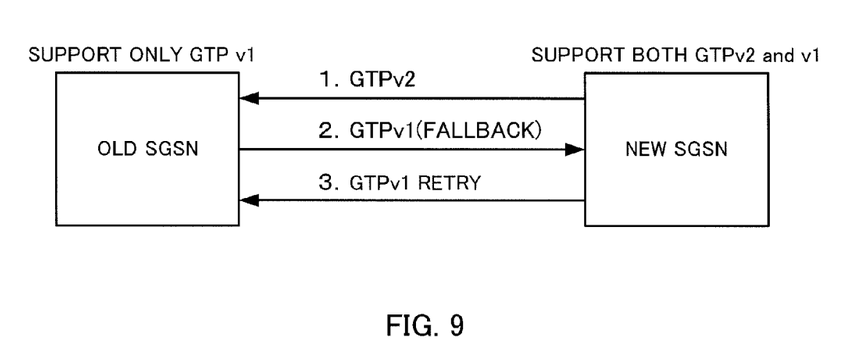
FIG. 9 is a diagram for explaining a fallback function for an unsupported protocol signal.

Note that, although, as illustrated in FIG. 9, section 7.10 of non-patent literature 3 describes that, when an old SGSN supporting only GTPv1 receives a GTPv2 signal from a new SGSN, the old SGSN applies a fallback to GTPv1 and performs a retry. However, when the old SGSN is able to support both GTPv1 and GTPv2, the above-described problems occurs.

The present invention has been made taking into account the above points, and it is therefore an object of the present invention to provide a mobile communication method and an exchange whereby a bearer getting processing can be reliably performed between an old SGSN and new SGSN and the situation where a service is interrupted can be prevented.

Solution to Problem

One aspect of the present invention includes the steps of: receiving, from a terminal having moved from a management area of a first exchange to a management area of a second exchange, a location update message at the second exchange; sending, from the second exchange having received the location update message to the first exchange, a first protocol signal for getting communication path information; notifying, to the second exchange, an error for causing a fallback to a second protocol by the first protocol signal, when a bearer is established between a GGSN, which is connected to the first exchange and an external IP network, and the first exchange, as a bearer for the terminal; and changing a protocol type to the second protocol, at the second exchange to which the error has been notified from the first exchange by the first protocol signal, and sending again a protocol signal for getting communication path information to the first exchange by the changed protocol type.

By this means, the first exchange learns the protocol type of a logical communication path, which is established for the terminal at present, and therefore is able to cause the second exchange to fallback smoothly.

Technical Advantageous of Invention

According to the present invention, a bearer getting processing is performed between an old SGSN and a new SGSN reliably, so that it is possible to prevent the situation where a service is interrupted from occurring.

DESCRIPTION OF EMBODIMENTS

An Embodiment of the invention will specifically be described below with reference to accompanying drawings.
(Embodiment 1)

Figure 1:
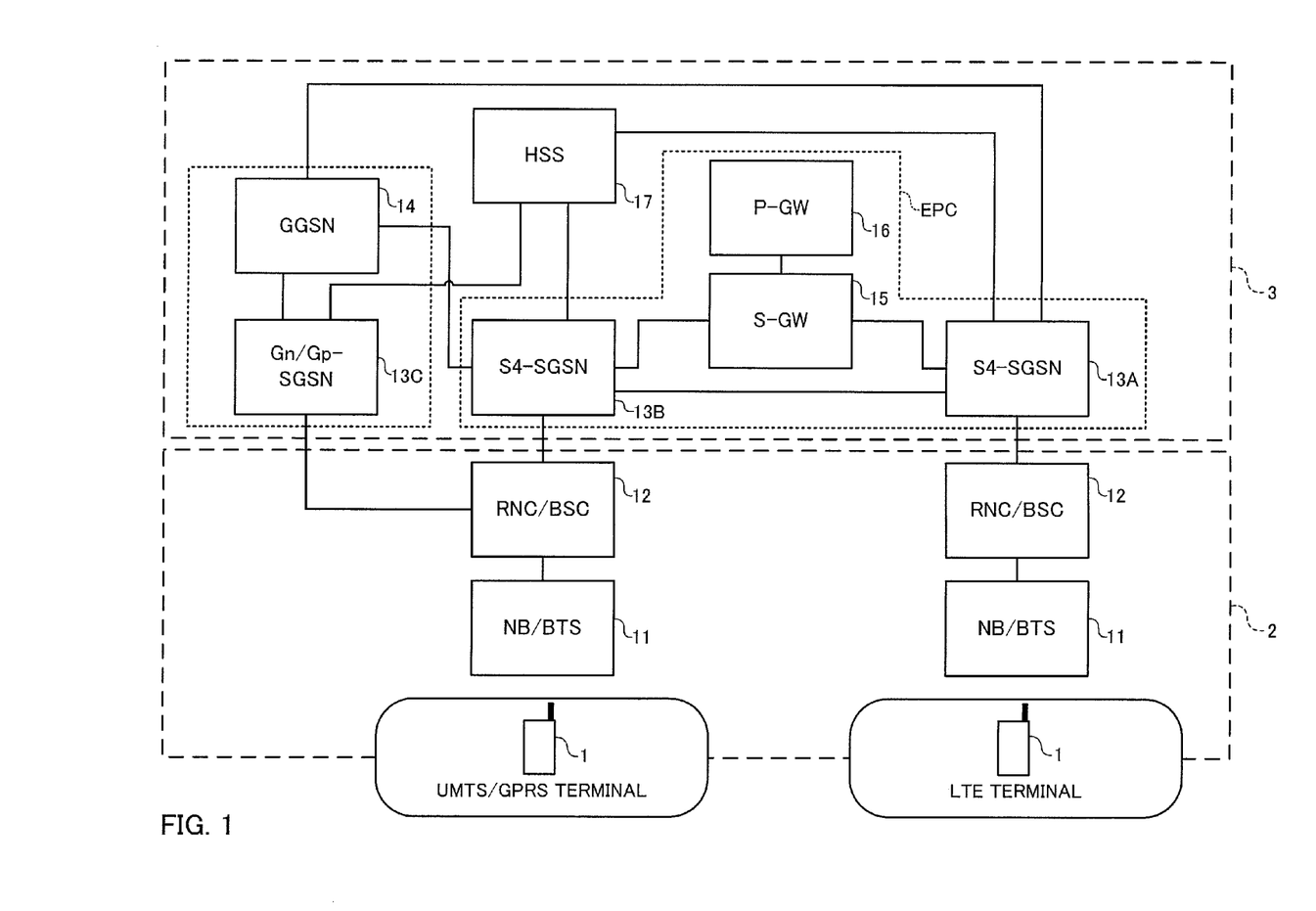
FIG. 1 is a diagram showing a configuration of a mobile communication network according to embodiment 1.

FIG. 1 is a diagram showing a configuration of a mobile communication network, and the core network section mainly shows a packet core section. The mobile communication network is configured to include a radio access network 2 that communicates with a mobile terminal 1 via radio waves, and a core network 3 that performs a connection processing and user data transfer.

The present embodiment targets a terminal that supports UMTS/GPRS and a terminal that supports LTE as a mobile terminal 1. The radio access network 2 is formed by a UTRAN (UMTS radio access network) or a GERAN (GSM/EDGE radio access network) that is capable of radio communication with a mobile terminal 1.

The radio access network 2 is configured to include radio base stations 11 provided in respective cells, and base station control apparatuses 12 that control a plurality of radio base stations 11. A radio base station 11 is referred to as a "node B" in UMTS, but may be referred to as a "BTS" (Base Transceiver Station). A base station control apparatus 12 controls a plurality of radio base stations 11, and controls allocation and switching of radio channels to terminals 1. The base station control apparatus 12 is referred to as a "radio control apparatus" (RNC: Radio Network Controller) or also referred to as a "BSC" (Base Station Controller).

The core network 3 is configured to include functional elements such as SGSNs 13A to 13C, a GGSN 14, an S-GW 15, a P-GW 16 and an HSS 17.

The SGSNs 13A to 13C recognizes the location of the terminal 1 accessing the packet exchange domain, and controls user traffic transfer between the GGSN 14 and the radio access network 2. Also, SGSNs 13A to 13C performs IP packet routing/transfer by a packet transfer protocol, and performs mobility management and session management (bearer control) that are required in mobile communication.

With the present embodiment, SGSNs 13A and 13B include an S3/S4 interface (GTP protocol, version 2). The SGSNs having an S3/S4 interface are enhanced functional elements to achieve mutual operation of UMTS and EPS. The S4 interface provided in the SGSNs 13A and 13B has function of session management (EPS bearer control) with the S-GW 15 using the GTPv2 signal, and user packet transfer. In FIG. 1, the SGSNs 13A and 13B, which support the GTP protocol, version 2, are referred to S4-SGSNs. The SGSNs 13A and 13B also include a Gn/Gp interface (GTP protocol, version 1). The SGSNs 13A and 13B are able to connect with the GGSN 14 of the packet core using GTPv1 signals, and establish GPRS bearers. The SGSN 13C is a functional element that does not have an S3/S4 interface and that has only a Gn/Gp interface (GTP protocol, version 1). In FIG. 1, the SGSN 13C, which supports only the GTP protocol, version 1, is referred to Gn/Gp-SGSN.

The GGSN 14 is a functional element to control connection between the UMTS/GPRS packet core and an external IP network in accordance with connection requests from the terminal 1. The GGSN 14 constitutes the UMTS/GPRS packet core with the SGSN 13C.

The S-GW 15 connects the U-plane between the radio access network 2 and the EPC, and provides user packet routing/transfer functions. The terminal 1 transfers IP packets via an EPS bearer, which is established between the SGSNs 13A and 13B and the S-GW 15 by the SGSNs 13A and 13B. The P-GW 16 functions as a connection point with the external IP network, and transfers user packets with the external IP network. The EPC network is formed with functional elements such as the S4-SGSNs 13A and 13B, S-GW 15 and P-GW 16, and an MME (Mobility Management Entity), which is not shown. An HSS 17 is a subscriber server that manages subscriber information. Subscriber information that is registered with the HSS 17 can be searched by user IDs and includes bearer information.

Figure 2:
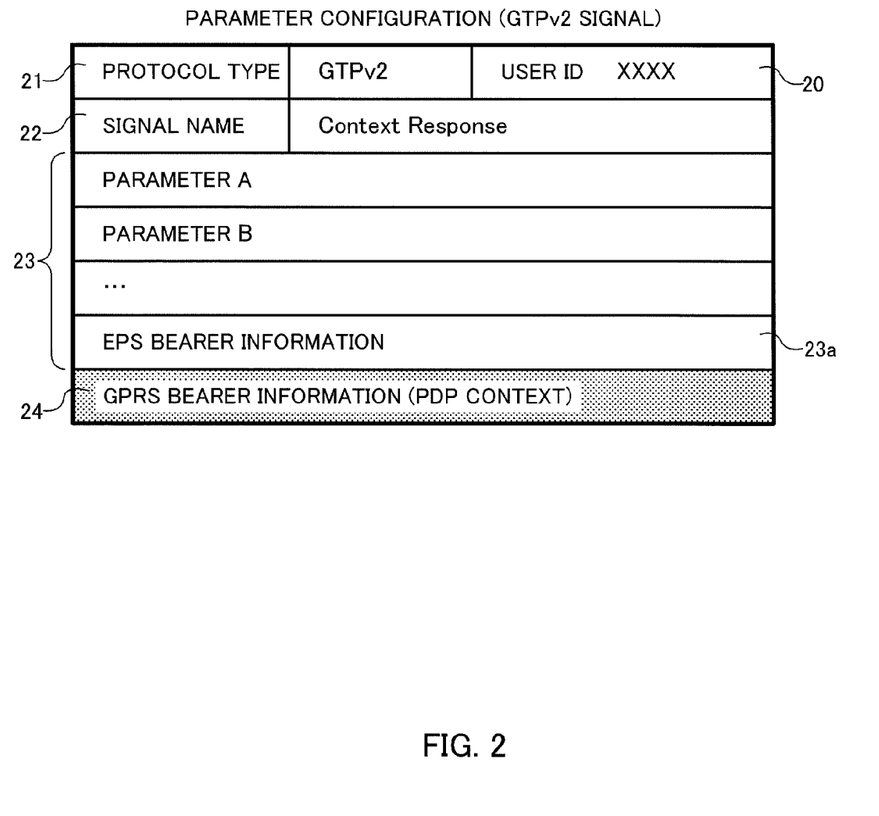
FIG. 2 is a conceptual diagram of a parameter configuration of a GTPv2 signal used in embodiment 1.

FIG. 2 is a conceptual diagram of a parameter configuration of a GTPv2 signal used in the present embodiment. As illustrated in this figure, the configuration includes a user ID 20, a protocol type 21, a signal name 22, existing parameters 23 and an additional parameter 24. The user ID 20 is information for identifying the user of terminal 1, from which a location update message has been notified. In the protocol type 21, "GTPv1" or "GTPv2" is set. In the signal name 22, "Context Request" is set upon requesting bearer information, or "Context Response" is set upon returning bearer information. In the existing parameters 23, various parameters A, B, and so on, which the current specifications define for "GTPv2" set in the protocol type 21, are set. The existing parameters 23 are configured such that EPS bearer information 23a can be set as a GTPv2 parameter. The additional parameter 24 is configured such that GPRS bearer information (PDP Context) to be processed by GTPv1, which is a protocol apart from GTPv2, can be set. Note that, since the GTPv2 signal parameter configuration illustrated in FIG. 2 has the signal name 22 ="Context Response," and therefore the additional parameter 24 for setting bearer information of a different protocol type is added, the additional parameter 24 is not added to "Context Request" for requesting bearer information.

In this way, according to the present embodiment, in the GTPv2 parameter configuration, GPRS bearer information (PDP Context), which is processed by GTPv1 of a different protocol version, is provided as an additional parameter 24. By this means, it is possible to set bearer information (GPRS bearer information) of a different protocol version in a GTPv2 signal.

Figure 3:
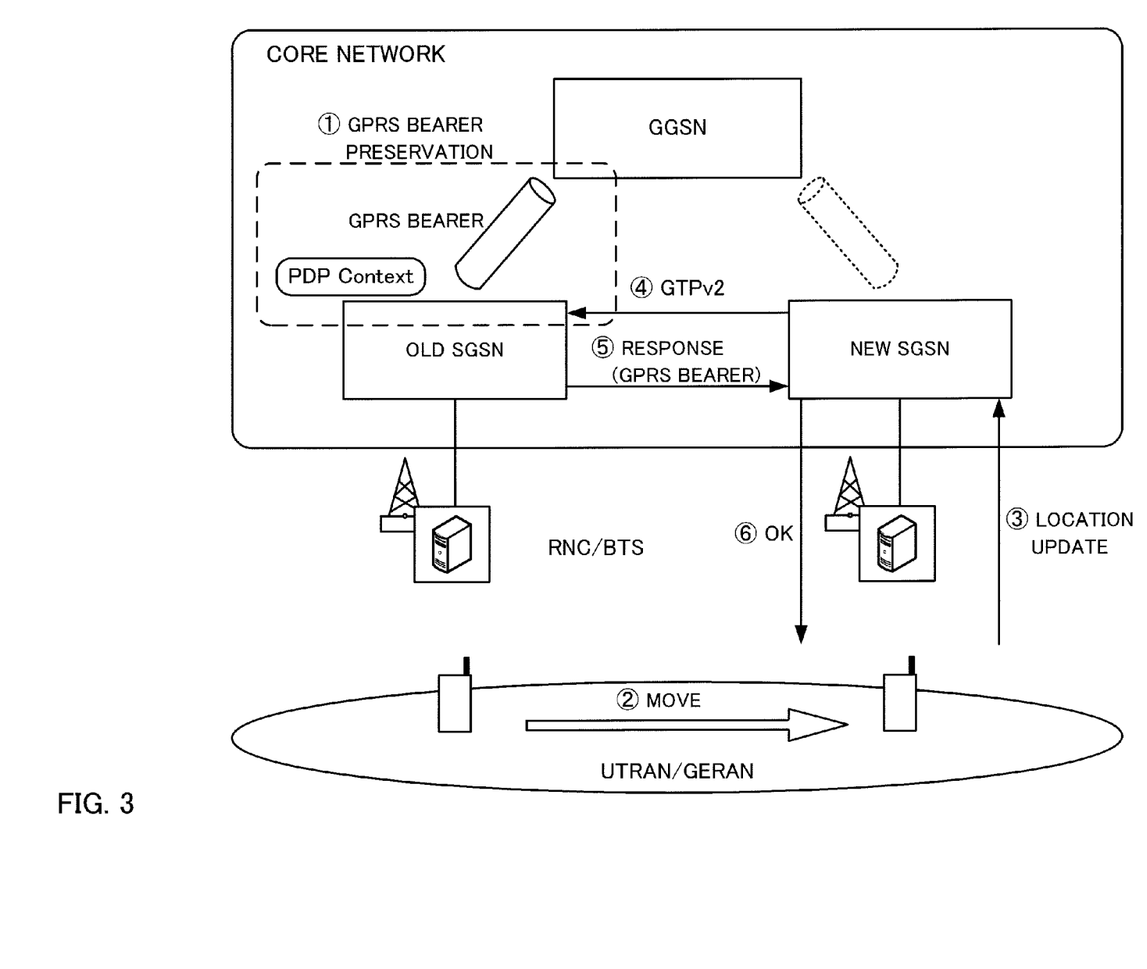
FIG. 3 is a diagram showing the procedure in which a new SGSN gets a bearer from an old SGSN, according to embodiment 1.
Figure 4:
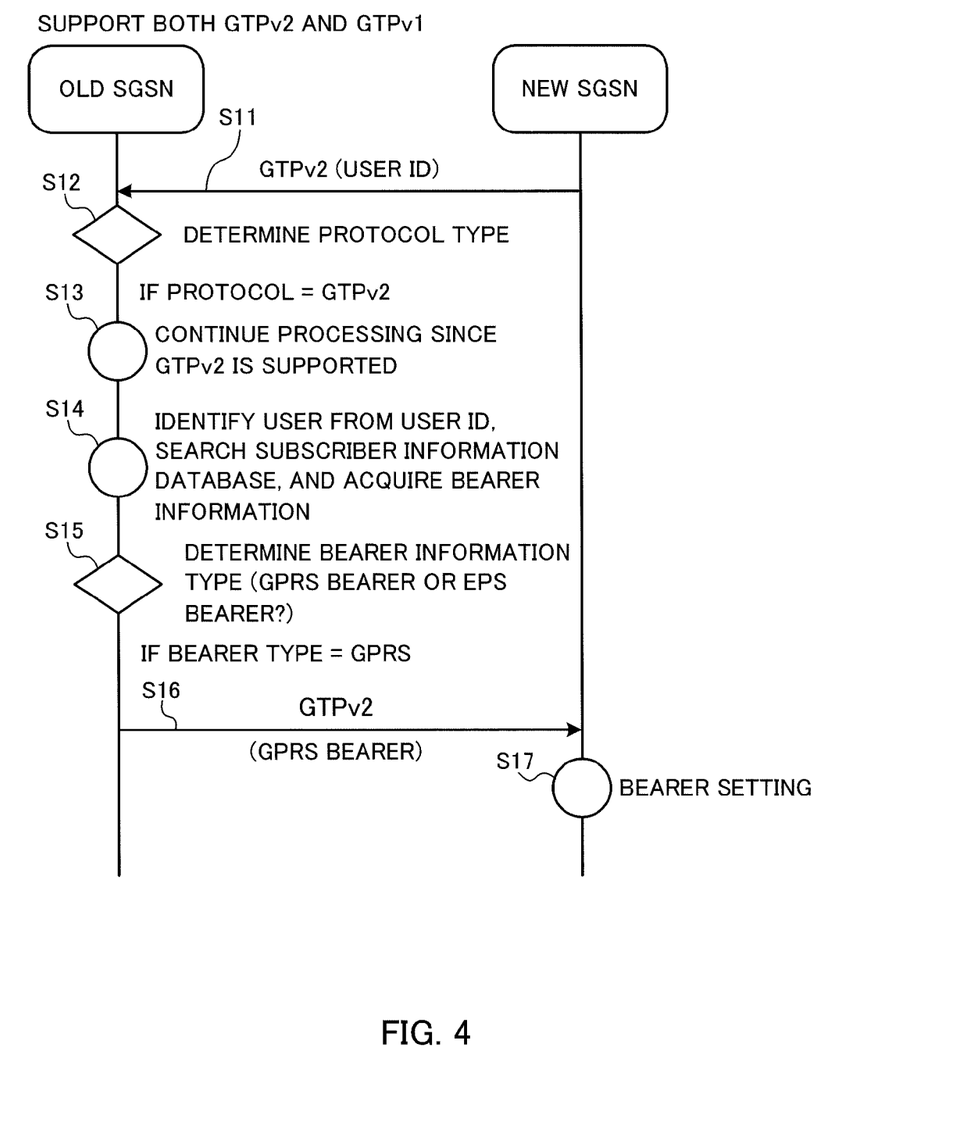
FIG. 4 is a sequence diagram corresponding to the getting of a bearer illustrated in FIG. 3.

Next, the operations of the present embodiment configured as described above will be described. FIG. 3 illustrates the procedure in which a new SGSN gets a bearer from an old SGSN, and FIG. 4 is a sequence corresponding to the getting of a bearer illustrated in FIG. 3. The new SGSN in FIG. 3 is one S4-SGSN 13A illustrated in FIG. 1, and the old SGSN is the other S4-SGSN 13B illustrated in FIG. 1. That is to say, the old SGSN (13B) and the new SGSN (13A) are both SGSNs to support both GTPv1 and GTPv2.

As illustrated in FIG. 3, the old SGSN (13B), which serves as the first exchange, establishes a GPRS bearer to a GGSN 14 as a bearer for performing, on the core network, packet transfer of user data of a terminal 1 which has already accessed the packet exchange domain. The terminal 1 is in idle mode and no user data is occurred, and therefore a preservation state (S1), in which radio resources are released while the GPRS bearer is maintained, is assumed.

As illustrated in FIG. 4, in the preservation state, when the terminal 1 moves from the management area of the old SGSN (13B) to the management area of the new SGSN (13A) serving as a second exchange (S2), the terminal 1 notifies a location update message to the new SGSN (13A) via a radio access network 2 to which the terminal 1 moves (S3). The new SGSN (13A), upon receiving the location update message from the terminal 1, sends a bearer information request to the old SGSN (13B) by a GTPv2 signal (S11). Here, assume that the new SGSN (13A) uses a GTPv2 signal uniformly as a protocol for performing a bearer information request.

When the old SGSN (13B) receives bearer information request (GTPv2), the GPRS bearer has been established. That is to say, while the bearer information which the old SGSN (13B) holds is a GPRS bearer by GTPv1, the protocol of the bearer information request is GTPv2, and therefore the bearer information and the protocol of the bearer information request do not match. If the specifications of above non-patent literature 2 are applied on an as-is basis, GPRS bearer information of a different protocol cannot be set as the EPS bearer information 23a in the GTPv2 signal, and therefore an error is returned. The present embodiment is configured such that the additional parameter 24, in which GPRS bearer information of a different protocol can be set, is provided in the GTPv2 signal parameter configuration (FIG. 2), and an error is not returned at this point in time. That is to say, upon receiving a bearer information request using a GTPv2 signal from the new SGSN (13A), the old SGSN (13B) determines the protocol type from the protocol type 21 of the GTPv2 signal (S12). In the event the protocol type is GTPv2, from the above-described preconditions, the old SGSN (13B) supports GTPv2, so that it is determined to continue the processing (S13).

The old SGSN (13B), having determined to continue the processing, identifies the terminal user from the user ID 20 of the GTPv2 signal, acquires the bearer information by searching for the bearer information that is currently established for the terminal user, from subscriber information that is held in the database of the SGSN (13B) (S14), and determines the bearer information type (S15). That is to say, whether the bearer that is currently established for the user's terminal 1 is a GPRS bearer or an EPS bearer is determined. From the above preconditions, the bearer is determined to be a GPRS bearer. If the currently established bearer information that is searched out is GPRS bearer information of a different protocol, an error is not returned, and this GPRS bearer information is set in the additional parameter 24 in the GTPv2 signal parameter configuration. By this means, GTPv2 signal, in which GPRS bearer information is set in the additional parameter 24, is sent as a response to the new SGSN (13A) (S16).

The new SGSN (13A) extracts the bearer information from the GTPv2 signal notified from the old SGSN (13B). Here, as illustrated in FIG. 2, if "PDP Context" is set in the additional parameter 24 of the GTPv2 signal, based on this PDP Context, a GPRS bearer for the terminal 1 is established with the GGSN 14 by GTPv1 (S17). Then, "OK" is returned to the terminal 1.

As described above, the present embodiment is configured such that a parameter of a GPRS bearer of a different protocol can be added in a GTPv2 signal, and, in the event the bearer, which has been established by the old SGSN having received a bearer information getting request by the GTPv2 signal when the GTP signal has been received, and the GTP signal do not match, bearer information that is held in the additional parameter 24 of the GTPv2 signal is set. As a result of this, in the event, in the old SGSN, the bearer that has been established upon reception of the GTP signal and the GTP signal do not match, even if the function for a fallback to a different protocol does not work, a bearer getting processing is performed reliably between the old SGSN and the new SGSN, and it is therefore possible to prevent the situation where a service is interrupted from occurring.

(Embodiment 2)

The present embodiment will be described presuming a mobile communication network having the same configuration as the mobile communication network illustrated in FIG. 1. The additional parameter 24 in the GTPv2 signal parameter configuration illustrated in FIG. 2 is not essential.

The present embodiment is configured such that, when the old SGSN receives a GTPv2 signal for requesting getting a bearer by GTPv2, the currently established bearer information type that is held in the old SGSN with respect to the terminal user is detected. When the bearer type is GPRS despite the fact that a bearer getting request has been received by a GTPv2 signal, "Fallback to GTPv1," which designates the protocol, is returned as a GTPv2 error.

Figure 5:
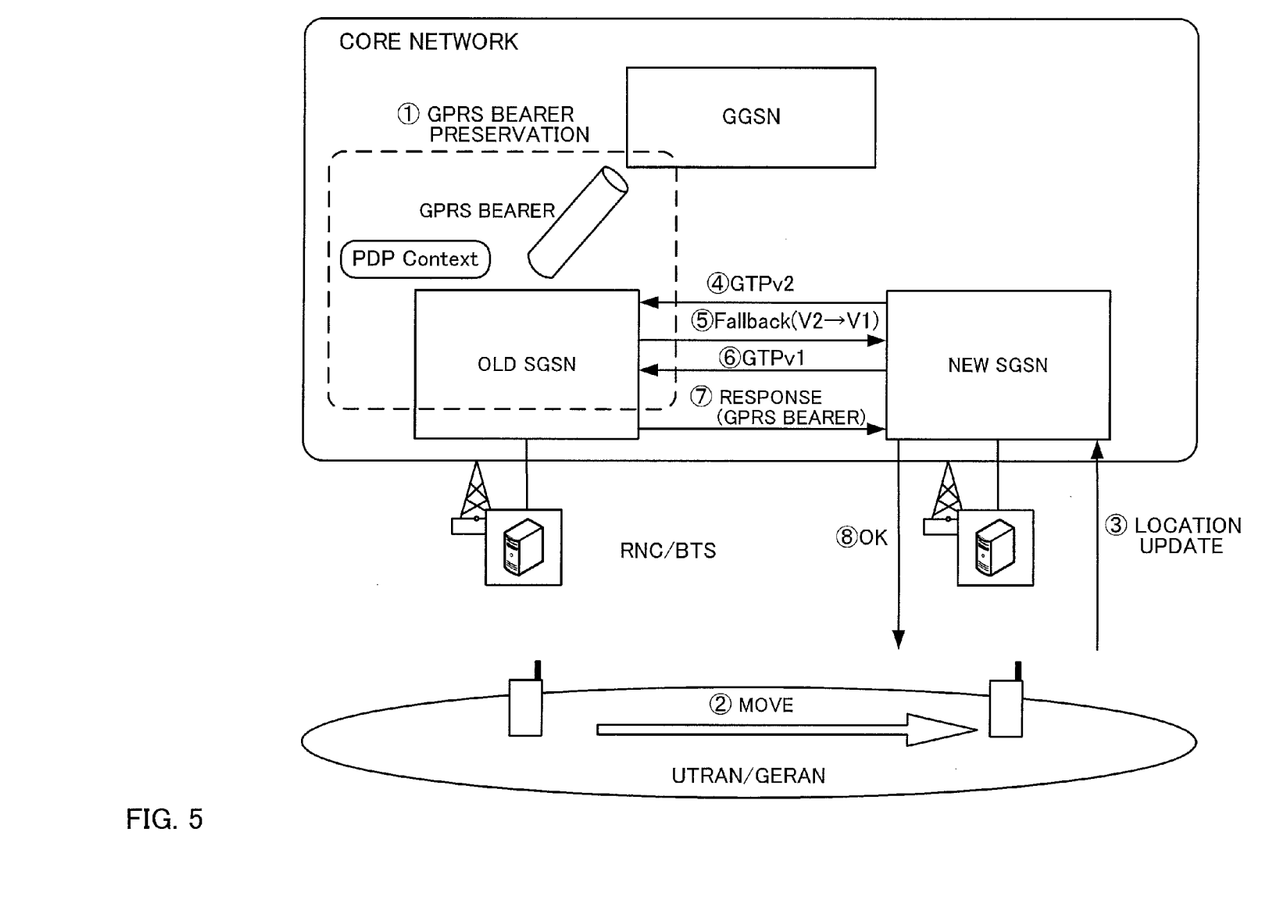
FIG. 5 is a diagram showing the procedure of getting a bearer according to embodiment 2.
Figure 6:
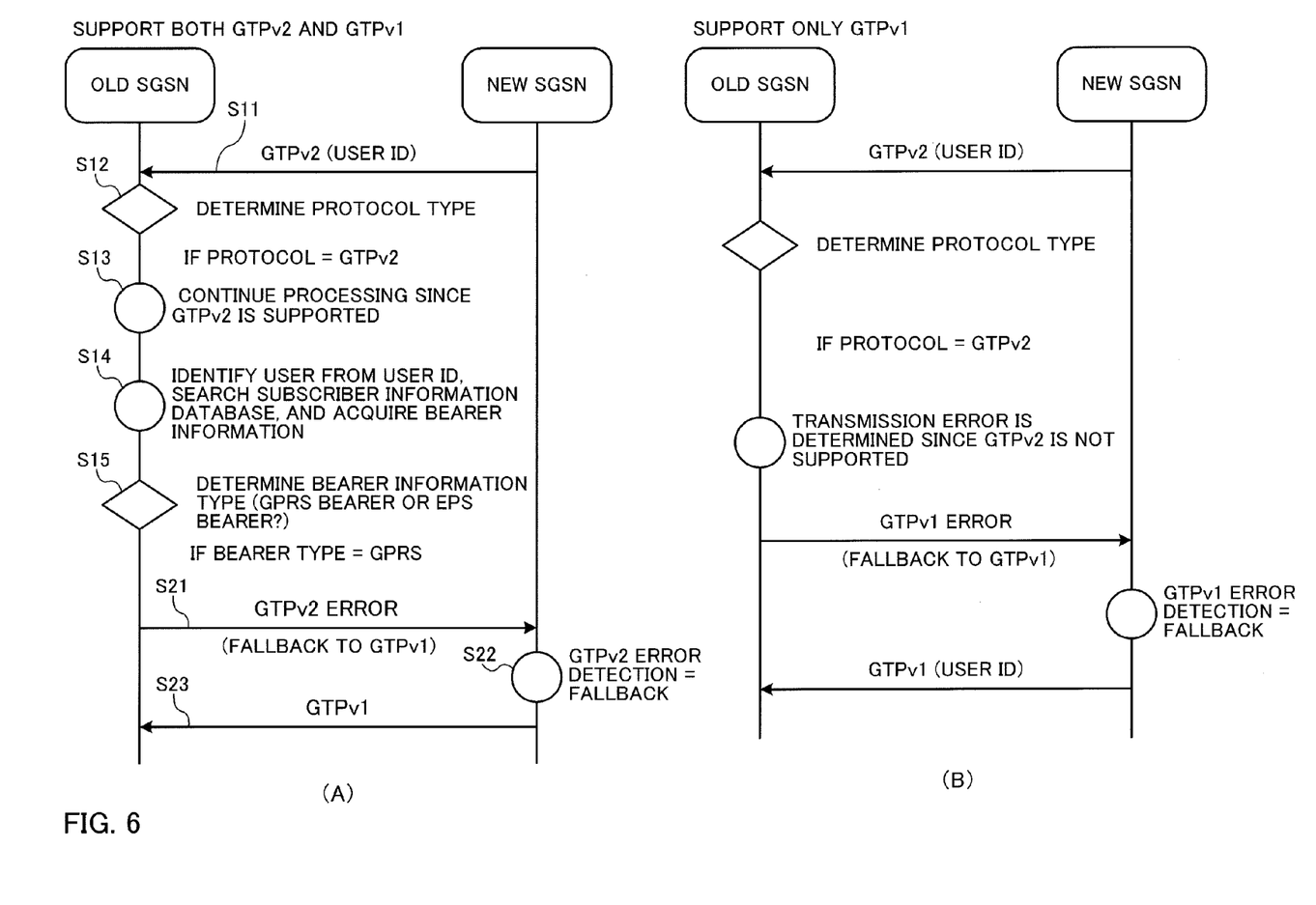
FIG. 6(A) is a sequence diagram corresponding to the getting of a bearer illustrated in FIG. 5.
FIG. 6(B) is a sequence diagram illustrating a fallback in the getting a bearer defined in non-patent literature 3.

The operations of the present embodiment will be described with reference to FIG. 5 and FIG. 6. FIG. 5 is a diagram showing the procedure in which a new SGSN gets a bearer from an old SGSN, and FIG. 6(A) is a sequence diagram corresponding to the getting of a bearer illustrated in FIG. 5. The new SGSN in FIG. 5 is one S4-SGSN 13A illustrated in FIG. 1, and the old SGSN is the other S4-SGSN 13B illustrated in FIG. 1. That is to say, the old SGSN (13B) and the new SGSN (13A) support both GTPv1 and GTPv2.

Following the same steps as in the above embodiment, the new SGSN (13A), upon receiving a location update message from a terminal 1, sends a bearer information request to the old SGSN (13B) by a GTPv2 signal (S11). The new SGSN (13A) uses a GTPv2 signal uniformly as a protocol for performing a bearer information request.

As illustrated in FIG. 6(A), the steps are the same as in above-described embodiment 1, from when the new SGSN (13A), having received a location update message from a terminal 1, sends a bearer information request (S11), until when the old SGSN (13B) determines the bearer information type (S15). Now, the steps after S15 will be described mainly. The old SGSN (13B) acquires bearer information (S14), and, as a result of determining the bearer information type (S15), from the above-described preconditions, the bearer information type is determined to be a GPRS bearer. The old SGSN (13B) sends a GTP2 error "Fallback to GTPv1," which instructs a fallback to GTPv1, to the new SGSN (13A) (S21).

The new SGSN (13A), upon receiving the GTPv2 error from the old SGSN (13B), performs GTPv2 error detection, and determines an error cause (S22). Since the error cause is "Fallback to GTPv1", the protocol is applied a fallback from GTPv2 to GTPv1, and a bearer information request is sent to the old SGSN (13B) using a GTPv1 signal (S23).

As a result of this, the old SGSN (13B) is able to set the currently established GPRS bearer information (PDP Context) in the GTPv1 signal and returns this to the new SGSN (13A) (S24).

FIG. 6(B) shows, as a comparative example, a sequence of the fallback functions defined in non-patent literature 3 (chapter of 7.10 of 3GPP TS29.274 (version 8.4.0)). As illustrated in this drawing, the sequence is the same up to the step in which the old SGSN receives a bearer information request and determines the protocol, but, according to the provision of the specification, the old SGSN does not support GTPv2, and, therefore, at this point, a transmission error is determined, and an error is returned by a GTPv1 signal which the old SGSN supports. Consequently, flexible support such as illustrated with present embodiment 2 is difficult.

In this way, the present embodiment 2 is configured to determine the bearer information type which is currently established by the old SGSN having received a bearer information request, and return a GTPv2 error so as to allow an adequate fallback, so that the new SGSN having received the GTPv2 error is able to switch the bearer information to a receivable protocol reliably, and, a bearer getting processing is performed reliably between the old SGSN and the new SGSN, preventing the situation where a service is interrupted from occurring.

Note that, although, with above embodiment 2, the old SGSN determines the bearer information type and sets the protocol type of the fallback destination in a GTPv2 error, how to determine the error content of the GTPv2 error may be changed as appropriate.

Figure 7:
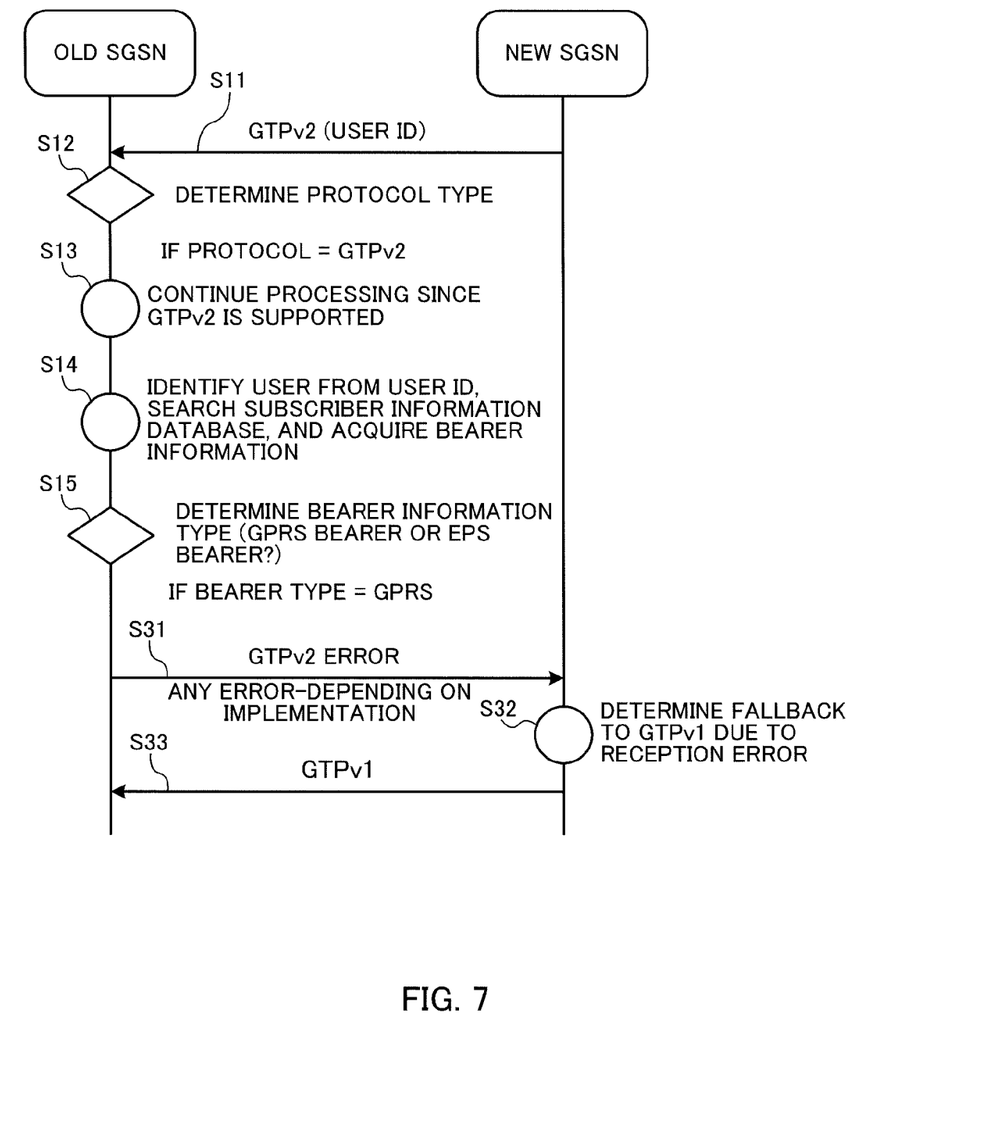
FIG. 7 is a sequence diagram modifying part of the procedure of getting a bearer according to embodiment 2.

For example, as illustrated in FIG. 7, although the same sequence as illustrated in FIG. 6(A) is employed up to the determination of the bearer information type (S11 to S15), it is equally possible to send as a response a GTPv2 error that does not designate the error content, to the new SGSN (S31). When a GTPv2 error is returned, the new SGSN subjects the protocol to use for the bearer information request to a fallback to a GTPv1 signal (S32), which is a different protocol, and reissues a bearer information request by a GTPv1 signal (S33).

In this way, it is possible to remove the processing of determining the error content when a GTPv2 error from the new SGSN.

The present invention is by no means limited to the above-described embodiments and can be implemented in various modifications without departing from the scope of the present invention.

The disclosure of Japanese Patent Application No. 2009-293016, filed on Dec. 24, 2009, including the specification, drawings, and abstract, is incorporated herein by reference in its entirety.

The invention claimed is:

1. A mobile communication method comprising the steps of:
   receiving, from a terminal having moved from a management area of a first node to a management area of a second node, a location update message at the second node, wherein the first node is able to support both GTPv1 (GTP protocol, version 1) and GTPv2 (GTP protocol, version 2 and the first node is able to establish both a GPRS (general packet radio service) bearer with a GGSN (gateway GPRS support node) and an EPS (evolved packet system) bearer with an S-GW (serving gateway);
   sending, from the second node having received the location update message to the first node, a GTPv2 signal for getting bearer information;
   notifying, from the first node to the second node, an error for causing a fallback to the GTPv1 by the GTPv2 signal, when the first node establishes the GPRS bearer with the GGSN as a bearer for the terminal; and
   changing a protocol type to the GTPv1, at the second node to which the error has been notified from the first node by the GTPv2 signal, and sending again a protocol signal for getting bearer information to the first node by the changed protocol type.

2. The mobile communication method as defined in claim 1, wherein in the step of notifying the error, when the bearer is established between the GGSN and the first node, the first node sends a GTPv2 signal including an instruction for the fallback to the GTPv1 as an error cause, to the second node.

3. The mobile communication method as defined in claim 1, wherein:
   in the step of notifying the error, when the first node establishes the GPRS bearer with the GGSN as the bearer for the terminal, the first node sends a GTPv2 signal including an instruction for the fallback to the GTPv1 as an error cause, to the second node; and
   upon receiving the GTPv2 signal including the instruction for the fallback to the GTPv1 as the error cause from the first node, the second node sends a GTPv1 signal for getting bearer information corresponding to the GTPv1, to the first node.

4. A first node of a mobile communication system to transmit, when a terminal moves from a management area of the first node to a management area of a second node, bearer information related to the terminal, to the second node of the mobile communication system, comprising:
   a section configured to receive, from the second node, a GTPv2 (GTP protocol, version 2) signal for getting the bearer information; and
   a section configured to send a GTPv2 signal including an instruction for a fallback to a GTPv1 (GTP protocol, version 1) as an error cause to the second node, when the first node establishes a GPRS (general packet radio service) bearer with a GGSN (gateway GPRS support node) as a bearer for the terminal,
   wherein the first node is able to support both GTPv2 and GTPv1, and the first node is able to establish both a GPRS bearer with a GGSN and an EPS (evolved packet system) bearer with an S-GW (serving gateway).

5. A first node of a mobile communication system to receive, when a terminal moves from a management area of a second node to a management area of the first node, bearer information related to the tettainal, from the second node of the mobile communication system, comprising:
   a section configured to send a GTPv2 (GTP protocol, version 2) signal for getting the bearer information to the second node;
   a section configured to send, when an error for causing a fallback to a GTPv1 (GTP protocol, version 1) is notified from the second node by a GTPv2 signal, a GTPv1 signal for getting bearer information corresponding to the GTPv1, to the second node; and
   a section configured to get, when the bearer information by the GTPv2 or GTPv1 is set in the GTPv2 or GTPv1 signal received from the second node, a bearer of the terminal based on bearer information by a relevant protocol
   wherein the first node is able to support both GTPv2 and GTPv1, and the first node is able to establish both a GPRS (general packet radio service) bearer with a GGSN (gateway GPRS support node) and an EPS (evolved packet system) bearer with an S-GW (serving gateway).

* * * * *